United States Patent Office 3,364,463
Patented Jan. 16, 1968

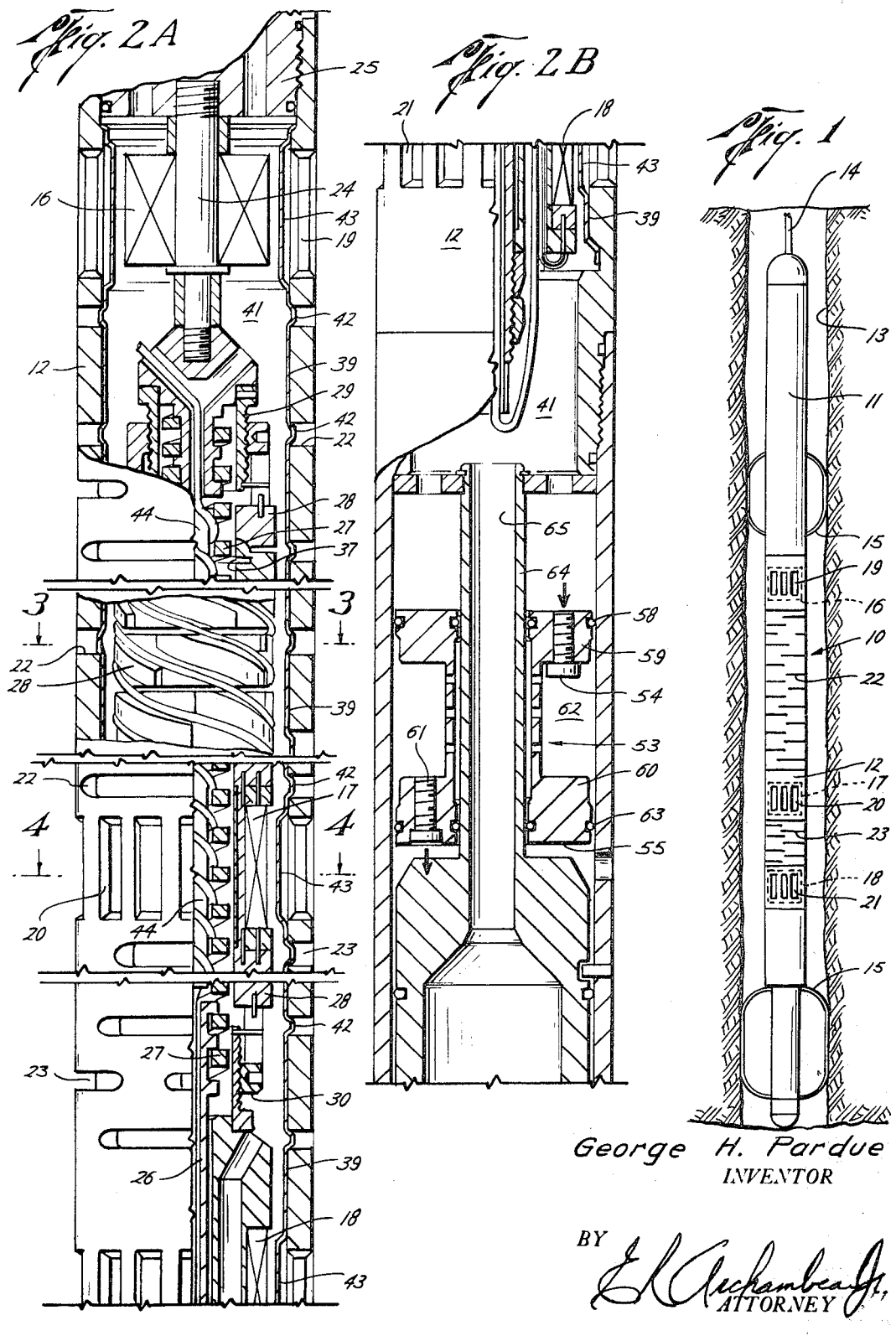

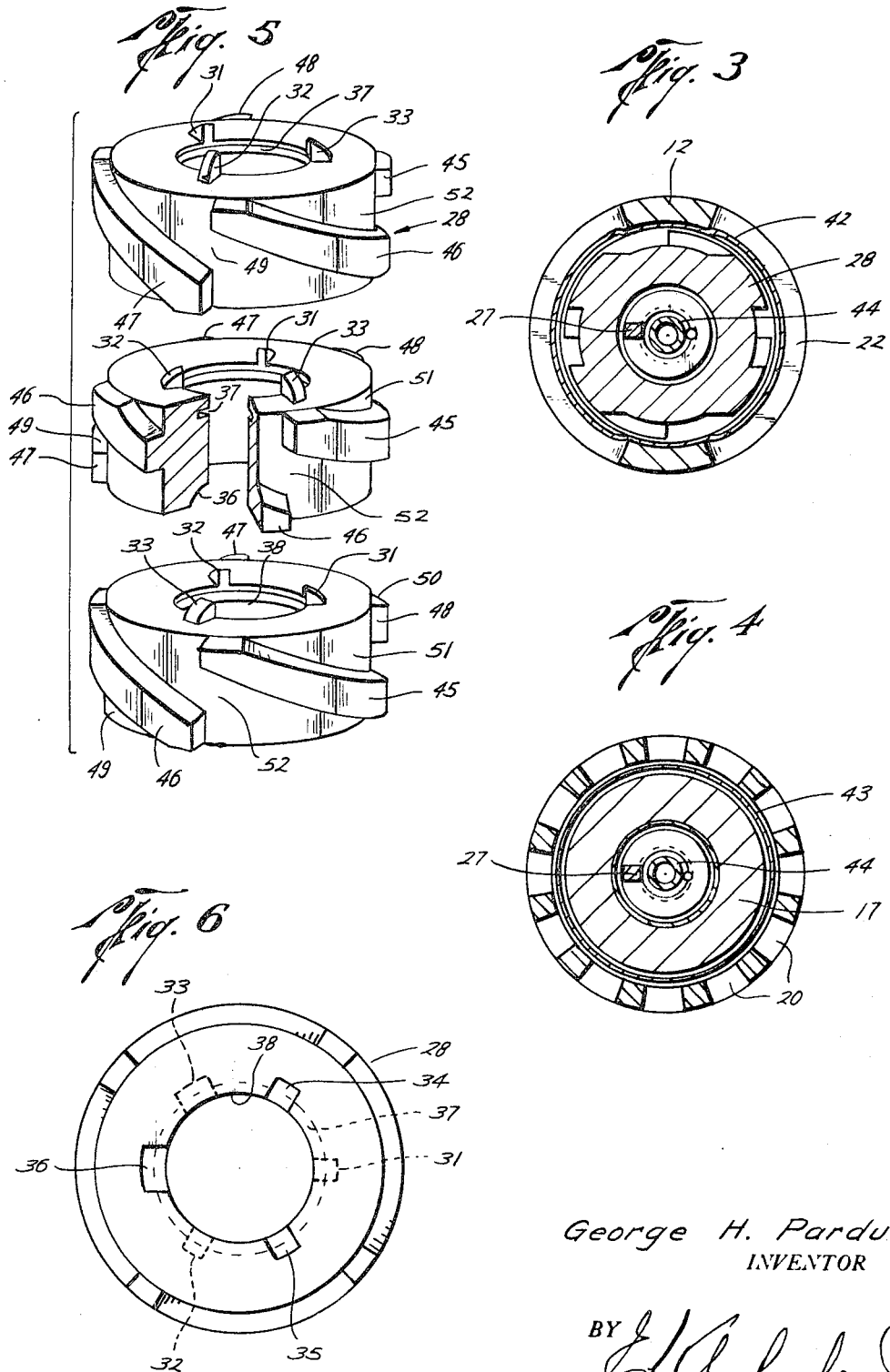

3,364,463
WELL LOGGING TOOL
George H. Pardue, Houston, Tex., assignor to Schlumberger Technology Corporation, Houston, Tex., a corporation of Texas
Filed July 1, 1966, Ser. No. 562,291
28 Claims. (Cl. 340—17)

This invention relates to sonic well logging tools; and, more particularly, to new and improved gas-tight and rigid enclosures for such tools that also include means for attenuating sonic signals traveling longitudinally through the enclosure.

A typical sonic well logging tool is usually comprised of at least three sonic transducers mounted on a support at longitudinally spaced intervals from one another. Two of these transducers are arranged as receivers and the other serves as a transmitter which periodically emits short pulses of sonic energy in all directions into the media surrounding the logging tool. Upon the detection of a sonic pulse by the receiver nearest to the transmitter, a timing circuit is activated. Then, when the same pulse is subsequently detected by the more distant receiver, the timing circuit measures the elapsed time to determine the velocity of sound through that portion of the surrounding media between the receivers. In more sophisticated systems, the wave forms of the detected pulses are also analyzed to determine amplitudes and other useful information.

The velocity of sound through liquids typically found in a well bore (usually so-called "muds") is in the order of 5,000-feet per second. On the other hand, the velocity of sound through earth formations will range from about 5,000-feet per second to about 25,000-feet per second. By way of comparison, most metals have a sonic velocity of about 13,000 to 20,000-feet per second.

Accordingly, since the velocity of sound through earth formations is substantially higher than through mud or other well bore fluids, a sonic signal will travel much faster through a formation than it will through the well bore. By properly spacing the transducers, the receivers will detect a sonic signal that has passed through the adjacent earth formations long before the signal can pass directly through the fluids in the borehole. Thus, by selectively operating the receivers only long enough to receive those signals passing through the formations, the slower and unwanted signals will not be detected.

It will also be recognized that a sonic logging tool must be so arranged that detectable sonic energy will not be transmitted longitudinally along the support between the transducers at a velocity comparable to that of sound through earth formations. Obviously, if this is not done, unwanted sonic signals will pass along the support and arrive at the receivers as the desired signals are received and prevent an accurate determination of the composite velocity of sound through the adjacent earth formations as well as hinder analyses of the pulse waveforms where necessary.

Accordingly, it has been customary heretofore to mount the transducers on a support having either a low sonic transmissibility or having some means for attenuating or delaying the sonic energy traveling longitudinally along the support. Typical of those supports having a low sonic transmissibility are those in which the transducers are either embedded in or mounted on an elastomeric or plastic material. It is obvious to those skilled in the art, however, that such tools are too flexible to be "spudded" past an obstruction in a well bore. Moreover, where transducers are embedded in an elastomeric or plastic material, their performance will be affected.

As exemplary of those housings that attenuate sonic energy traveling along the support, the apparatus disclosed in Patent Nos. 3,190,388, 3,191,141, 3,191,142 and 3,191,143 are typical. Although each of these have been successful these supports are open and exposed to well control fluids which, in time, will corrode or damage the wiring and the sonic transducers. Attempts to enclose such open supports with elastomeric materials and the like have not been too successful inasmuch as this often affects the radial transmission of sound. Moreover, where the logging tool is used in either a gas-filled borehole or in one having a liquid therein with a substantial quantity of gas in solution, gases will slowly permeate through elastomeric materials while the tool is in the borehole. Then, as the logging tool is removed from the well bore, the entrapped gases will be unable to escape rapidly from the logging tool and may quite possibly burst the elastomeric linings.

Accordingly, it is an object of the present invention to provide new and improved sonic logging tools that are not only gas-tight and have a relatively high mechanical strength but nevertheless include means for significantly attenuating sonic energy traveling longitudinally therethrough.

To accomplish this and other objects of the present invention, a sonic well logging tool is arranged to include a relatively stiff, high-strength tubular member for carrying spaced acoustic transducers. The tubular member is so slotted that the direct transmission of sonic energy in a longitudinal direction therealong is substantially attenuated and delayed. A thin, fluid-impermeable sleeve fitted to the housing and expanded into the slots sealingly encloses the interior of the tool and transducers therein. To support at least some of the transducers as well as to attenuate sonic signals traveling longitudinally inside of the housing, a plurality of vertebrate-like discs or rings with spacing means therebetween are stacked together between each of the transducers. Biasing means maintain the vertebrate members in this stacked relationship. The interior of the tool is filled with a suitable liquid.

The novel features of the present invention are set forth with particularity in the appended claims. The operation together with further objects and advantages thereof, may best be understood by way of illustration and example of certain embodiments when taken in conjunction with the accompanying drawings, in which:

FIG. 1 is a view of a sonic logging tool arranged in accordance with the principles of the present invention;

FIGS. 2A–2B are successive enlarged cross-sectional views of a portion from the apparatus of FIG. 1;

FIGS. 3–4 are cross-sectional views respectively taken along the lines 3—3 and 4—4 of FIG. 2A;

FIG. 5 is a pictorial view depiciting a portion of the apparatus of FIGS. 2A and 2B; and FIG. 6 is a plan view of one of the members illustrated in FIG. 5.

Turning now to FIG. 1, an elongated, rigid sonic logging tool 10 having an upper and a lower housing 11 and 12 and arranged in accordance with the present invention is shown as it might appear within a well bore 13. The tool 10 is suspended from an armored electrical cable 14 that is spooled from a winch (not shown) at the earth's surface in the usual manner. If it is desired to maintain the tool 10 centered in the well bore 13, one or more centralizers 15 may be mounted on the tool as required.

Inasmuch as the particular sonic logging system used is of no consequence here, to simplify the explanation of the invention it will be assumed that a single transmitting transducer 16 and two receiving transducers 17 and 18 are mounted in the lower housing 12 of the tool 10 and most, if not all, of the electronic circuitry is mounted in the upper housing 11. Typical of such logging systems is that described in Patent No. 3,231,041 to Frank P. Kokesh. Briefly stated, in the Kokesh system, a keying circuit periodically triggers the transmitter 16 to emit a short pulse of sonic energy. At the same time, a pulse generator is conditioned to operate after a predetermined delay but certainly before an emitted pulse of sonic energy could travel through the adjacent earth formations and reach the receivers 17 and 18. When the first receiver 17 detects a sonic signal, an electrical signal produced thereby triggers this pulse generator to provide a first output pulse which simultaneously starts a multivibrator that is coupled to a timing circuit as well as enables a second pulse generator. Then, whenever the sonic signal is detected by the second receiver 18, it triggers the now-enabled second pulse generator to produce a second output pulse that stops the multivibrator. The time interval between the first and second output pulses is then converted by the timing circuit into an analogue signal that is transmitted to the surface by way of the cable 14.

The lower housing 12 itself is arranged in accordance with Patent No. 3,191,141 to Nick A. Schuster and includes three groups of circumferentially spaced longitudinal slots 19–21 along the housing and each respectively adjacent to one of the transducers 16–18 and two groups of particularly arranged staggered peripheral slots 22 and 23 around the lower housing between the transducers. As fully described in the Schuster patent, these vertical slots 19–21 provide "windows" through which sonic signals may pass radially to and from the transducers 16–18 with little or no interference. On the other hand, the peripheral transverse slots 22 and 23 are appropriately arranged to break up any direct longitudinal paths along the lower housing 12 and leave only greatly lengthened and tortuous paths through which sonic signals can travel longitudinally. In this manner, by substantially interrupting the longitudinal continuity of the housing, the path that a sonic signal must travel along the lower housing 12 is so lengthened that a sonic signal can pass through the formations and be detected by both of the receivers 17 and 18 long before the signal has had time to travel along the housing.

As previously mentioned, the present invention is generally directed not only to providing a gas-tight enclosure but also to providing a relatively rigid, but articulated, adjustable support means for the transducers 16–18, with neither the enclosure nor the support being efficient conductors of sonic energy. In this manner, the tool 10 will be of sufficient strength and rigidity that it can withstand rough treatment in and out of a well bore. Moreover, inasmuch as the tool 10 is fluid-tight, the transducers 16–18 and other components therein will not be exposed to the corrosive and dirty well bore fluids. Yet, the present invention facilitates the care and maintenance of the various components comprising the tool 10.

Accordingly, as best seen in FIG. 2, the upper transducer 16 is mounted on a central support member 24 depending from an interconnecting housing sub 25 between the upper and lower housings 11 and 12. The intermediate and lower transducers 17 and 18 are not directly mounted on the housing 12, however, but are instead dependently supported below the upper transducer 16. To accomplish this, the lower transducer 18 is mounted on a tubular member 26 and suspended below the upper transducer 16 by a helical spring 27 secured at its upper end to the central member 24 and at its lower end to the tubular member 26. It will be understood, of course, that since the total helical length of the spring 27 is significantly longer than the straight-line or axial length of the spring, sonic signals traveling along the spring will be materially delayed so as not to interfere with the reception of the desired signals by the receivers 20 and 21.

A plurality of flat, annular, vertebrate-like members 28 arranged in accordance with the present invention are stacked between the upper and lower transducers 16 and 18 and appropriately distributed above and below the intermediate transducer 17 to support it in the proper relation to the other transducers. The tension of the spring 27 is sufficiently strong that the vertebrate members 28 will be held into a fairly rigid stacked column.

It will be appreciated, therefore, that by appropriately adjusting the tension of the spring 27 and arranging the number of vertebrate members 28 between the transducers 16–18, the intermediate and lower transducers will be maintained in whatever fixed relationship is desired. Thus, in effect, the intermediate and lower transducers 17 and 18 are dependently secured below the upper transducer 16 by an axially rigid, but laterally articulated, column of the stacked vertebrate members 28. To ensure that the intermediate and lower transducers 17 and 18 can be disposed exactly opposite their respective slots 20 and 21, adjusting means, such as threaded collars and sleeves 29 and 30, are provided in the column.

The vertebrate members 28 must, of course, be so arranged that sonic energy transmitted through them is either substantially attenuated or else sufficiently retarded as not to interfere with the detection of those sonic signals returning from the earth formations. Accordingly, although such light-weight sound-attenuating materials as certain plastics, sintered metals, and the like, could be used, for reasons that will subsequently become apparent, it is preferred to make the vertebrate members 28 of metals such as aluminum, brass, or magnesium even though this slightly increases their weight.

It will be appreciated that since the velocity of sound through a metal such as one of these is in the range of 13,000 to 20,000-feet per second, metals such as these would not ordinarily be considered as being an appropriate material for attenuating sonic signals. Nevertheless, it has been found that by spacing the vertebrate members 28 a slight distance apart from one another, a quite substantial attenuation of sonic energy is obtained.

Accordingly, as best seen in the exploded view of FIG. 5 and the bottom view of FIG. 6, to space the vertebrate members 28 apart, means, such as separate spacer members or integral projections on one or the other of the adjacent vertebrate members, are provided. Although such projections may take several configurations, it is preferred to space the members 28 apart with three integral longitudinal projections 31–33 (FIG. 5) on one face, with each projection having a transverse cross-sectional area at its base as small as possible and a free end that comes to a point. In this manner, for sonic energy to be transmitted from one vertebrate member 28 to another, it can pass only through the minimal transverse area of the projections 31–33 of each vertebrate member. By arranging the spacing means to provide such alternating increasing and decreasing cross-sectional areas, a significant sonic impedance imbalance or mismatch is obtained. Moreover, each time a sonic signal passing through the stacked members 28 changes direction in the column or is reflected by the impedance mismatch, a portion of the signal will be transmitted into the surrounding media where it will be attenuated.

In the preferred embodiment of these vertebrate members 28, aluminum was used to minimize their weight. Each member 28 was made 0.950-inch thick, with parallel transverse faces, an outside diameter of 2.70-inches to provide a fairly close fit within the housing 12, and an axial bore therethrough of 1.225-inches diameter to accommodate the spring 27. The projections 31–33 were formed on one transverse surface of each member 28 and uniformly distributed thereon between circumscribing coaxial circles having diameters of 1.225-inches and 1.62-inches respectively. The height of each of the projections 31–33 was 0.24-inch. Complementary recesses 34–36 (FIG. 6) were formed in the opposite transverse face of each member 28 to receive the free ends of the projections 31–33 of the adjacent member. These recesses 34–36 were 0.19-inch deep so that, when stacked, there was a spacing of 0.05-inch between the opposed transverse faces of adjacent members 28 to permit free articulation of the column for the expected lateral deflection of the housing 12.

In one test, the above-described projections were first made in the form of continuous annular skirts of the above-mentioned dimensions. The outer ends of these skirts and the complementary surfaces of their receiving annular recesses were formed in a spherical surface so that adjacent members would move freely in any direction. By making these spherical surfaces of slightly different radii, the mating portions made only a thin, single-line contact. With the members formed in this manner, the effective velocity of sound through a stack of them was found to be about 10,000-feet per second. Very significant attenuation of sound was also noted. By cutting out most of the continuous skirt and leaving only the three longitudinal projections 31-33, the effective velocity of sound through a stack of members was reduced to about 6,000-feet per second. A marked further increase of attenuation was found by this modification. Two of these projections 31 and 32 were 0.218-inch wide and the third projection 33 was 0.375-inch wide for a reason subsequently to be explained.

To further decrease the velocity of sound through a stack of the members 28 and provide still more attenuation, it was found of further benefit to form an internal circumferential groove 37 (FIGS. 5 and 6) around the bore 38 through each member. By undercutting the members 28 with this groove 37 a short distance below the base of each of the projections 31-33, the effective velocity of sound through the stacked members was reduced to slightly below 5,000-feet per second. The grooves 37 were each 0.23-inch deep radially and 0.07-inch high.

Similar results were obtained when the members 28 were made of brass. Although the velocity of sound is lower in brass, it is still preferred, however, to use aluminum because of its significant reduction in weight. Some improvement was noted by alternating the materials in a given stack rather than having all members of the same material.

It will be appreciated that although the housing 12 is substantially strong, it will nevertheless be subjected to some flexing as it is being handled. To compensate for such flexure, the projections 31-33 are uniformly spaced about the central axes of the vertebrate members 28 and the free end of each projection 31-33 is rounded to provide a fragmentary portion of a transverse spherical surface that, if complete, would circumscribe each of the projections. The complementary recesses 34-36 formed in the opposite transverse face of each of the vertebrate members 28 are each appropriately positioned and arranged for receiving one of the projections 31-33. Inasmuch as the co-engaged surfaces of the projections 31-33 and shallow recesses 34-36 are generally spherical, the stacked vertebrate members 28 are free to tilt relative to one another and about their longitudinal axis in any direction. In this manner, the stacked column of vertebrate members 28 is substantially articulated and will freely flex as the housing 12 is bent.

Although the lower housing 12 could be left open, as previously discussed, it is nevertheless greatly preferred to enclose the transducers 16-18 and the vertebrate members 28. To accomplish this, a thin sleeve 39 of a fluid-impermeable material, such as a metal, is complementarily fitted within the housing 12 and fluidly sealed at each end thereof to the housing. The upper and lower ends of the housing 12 are, of course, closed by suitable closure members, as at 40 on the bottom and the housing sub 25 at the top.

With the metal sleeve 39 in place within the housing 12, it will be appreciated that to efficiently transfer sonic energy in a radial direction, the enclosed space 41 must be filled with some suitable liquid. Since the velocity of sound through oils is in the order of 4,000 to 5,000-feet per second, an oil is used to fill the housing 12 since sonic signals can not be transmitted thereby longitudinally through the housing any faster than they can travel longitudinally through the well bore 13 outside of the tool 10. It will be understood, of course, that since the radial clearance between the transducers 16-18 and the metal sleeve 39 is quite small, there will be no appreciable effect on the transmission and reception of sound in a radial direction.

It will be appreciated that if the metal sleeve 39 were of a uniform diameter, it would present an effective path for the rapid transfer of sound longitudinally through the sleeve from the transmitting transducer 16 to the receiving transducers 17 and 18. As described, however, in application Ser. No. 381,118, filed July 8, 1964, by Walter E. Cubberly, Jr., sonic transmission longitudinally along a thin metal sleeve is greatly attenuated by transverse convolutions formed at spaced intervals along the sleeve.

Accordingly, to prevent such unwanted longitudinal transmission of sonic energy within the housing 12, the sleeve 39 is convoluted in accordance with the Cubberly invention. Although the convolutions could be directed inwardly, a plurality of convolutions 42 are instead directed outwardly and formed within each of the transverse slots 22 and 23 in the housing 12 to provide as much free, internal clearance as possible within the sleeve 39. Formation of the convolutions 42 will, of course, secure the sleeve 39 relative to the housing 12. It will be appreciated that the convolutions 42 and the slots 22 and 23 will not bypass one another but will instead cooperate to significantly attenuate sonic energy in the same manners as disclosed in the aforementioned Cubberly application and Schuster patent. It should be noted, moreover, that the sleeve 39 is formed with a uniform diameter smaller than the housing, as at 43, adjacent to each of the transducers 16-18 so as not to interfere with the effective radial transmission of sound through the windows 19-21 to and from the transducers.

In one manner of forming the convoluted sleeve 39, the sleeve is first slipped into the housing 12 before the convolutions 42 are formed. Then, by fitting a short cylindrical block of fairly soft rubber (not shown) into the sleeve 39 and applying opposed axial forces to each end of the block, the radial expansion of the rubber block will form the convolutions 42 as desired. Since it is not desired to form convolutions into the longitudinal slots 19-21, the rubber block is not positioned opposite these slots. Thus, by progressively moving the block of rubber along the sleeve 39 and applying the opposed forces as required, the convolutions 42 will be formed.

The sleeve 39 may also be secured to the housing 12 by a suitable adhesive such as an epoxy or the like. In this manner, any slight annular voids between the exterior of the sleeve 39 and interior of the housing 12 will be filled and unwanted debris and the like can not become lodged therein. If desired, those portions of the lower housing 12 in which the transverse slots 22 and 23 are formed can be covered with lead or an elastomeric material (not shown) to prevent entry of foreign matter into these slots as well as further enhance the attenuation properties of the housing.

It will be appreciated that a great number of electrical conductors must be passed from the upper housing 11 into the lower housing 12 and possibly even further therebelow to other tools (not shown). Accordingly, to accommodate such conductors, a central member 44, such as an elongated cylindrical member of a sound-attenuating material as plastic or the like, is extended through the stack of vertebrate members 28 and the spring 27. As best seen in FIG. 2, this cylindrical member 44 will permit conductors to be coiled thereabout and be confined between adjacent turns of the spring 27.

Similarly, it has also been found advantageous to provide conductor-receiving means around each of the vertebrate members 28 to permit one set of conductors to be passed through the bores 38 of the vertebrate members and other sets of conductors to be coiled around the members. Accordingly, by providing one or more external slanting ribs 45–48 about the exterior of each vertebrate member 28, a number of helical channels 49–52 will be formed around the stacked members for receiving a corresponding number of conductor groups. As best seen in FIG. 5, each vertebrate member 28 is formed with the four external ribs 45–48 spaced equally about its circumference and pitched at a sufficient lead angle that each rib will extend between the transverse surfaces.

By arranging the vertebrate members 28 for stacking in a particular ordered sequence, the four separate helical wire passages 49–52 are formed around the exterior of the vertebrate members. Since each of the four ribs 45–48 extend over an arc of 90°, it will be recognized that the vertebrate members 28 must be angularly aligned relative to one another at one of four positions. Moreover, since the number of projections 31–33 will influence the attenuation effectiveness of the members 28, it is preferred to use only the three projections. Thus, as best seen in FIG. 6, to assure that the vertebrate members 28 remain correctly positioned so as to keep the helical wire-retaining channels 49–52 in alignment with one another, one of the longitudinal projections 33 and its recess 36 are made larger than the other projections 31 and 32 and recesses 34 and 35. In this manner, the vertebrate members 28 are maintained in a predetermined angular relation to one another.

To accommodate volumetric changes in the oil filling the enclosed space 41 that are due to variations in well bore temperatures and to equalize pressures inside and outside of the tool 10, a floating compensating piston 53 (FIG. 2B) having a normally-closed check valve 54 therein is slidably disposed in the lower portion of the housing 12 and normally engaged with a stop, as at a housing shoulder 55. The enclosed space 41 is filled through a filling port (not shown) with a sufficient quantity of a suitable hydraulic oil to displace the piston 53 against the shoulder 55. By arranging the check valve 54 to open to discharge oil from within the housing 12 but remain closed to prevent the entry of well bore fluids into the enclosed space 41, it will be appreciated that as the oil expands from an increase in temperature, a sufficient amount of it will be discharged through the check valve to prevent rupture of the metal sleeve 39. Should the hydrostatic pressure increase sufficiently or the ambient temperature decrease, the piston 53 is of course free to move upwardly to maintain the space 41 filled.

It will be appreciated that well bore fluids will be admitted by way of a lateral port 57 into that portion of the housing 12 below the piston 53. Thus, should the piston 53 be displaced upwardly, the internal walls of the housing will be coated with mud and the like from the well bore fluids as the walls are exposed by movement of the piston. Then, whenever the piston 53 is returned to its original position by either a further expansion of the oil or replenishing of the supply during subsequent maintenance, it is expected that small residual amounts of the mud will most likely remain on the cylinder walls and be passed over by the sealing members, as at 58, on the piston. It is of course undesirable to permit the oil in the space 41 to be contaminated by such foreign material.

Accordingly, to prevent contamination of the oil in the enclosed space 41, it is preferred to arrange the piston 53 with spaced piston portions 59 and 60 and mount another check valve 61 in the lower piston portion 60 that is similar to the check valve 54 already described. In this manner, the space 62 between the piston portions 59 and 60 will serve as an intermediate chamber that will trap any contaminates that may pass beyond the lower piston portion 61. It is also expected that the sealing members, as at 63, on the lower piston portion 60 will wipe away a substantial amount of any contaminant coating the cylinder wall to greatly reduce the amount of contaminants entering the space 62. Then, as the oil is replenished, an excess amount can be added through the filling port (not shown) to flush any contaminants in the space 62 out through the check valve 61.

Although the piston 53 could just as well be solid, it will be noted from FIG. 2B, that the piston 53 is preferably made annular and is disposed around a tubular member 64 in the lower end of the housing 12. In this manner, a passage 65 through the tubular member 64 is provided for electrical conductors (not shown) leading to other tools (not shown) below the logging tool 10.

It should be noted that the vertebrate members 28 serve still another useful function, i.e., to reduce the amount of oil required to fill the enclosed space 41 but without materially increasing the overall weight of the tool 10. By using such materials as aluminum and magnesium, a substantial portion of the volume in the space 41 can be filled without too much additional weight. Thus, by reducing the total volume of oil in the space 41, the change in oil volume due to temperature variations will be significantly reduced. Thus, although the previously mentioned plastics and sintered materials would be suitable for sound attenuation, the sintered materials would not displace as much oil as would a solid metal. Moreover, it is possible that a plastic vertebrate member would expand a substantial amount from temperature changes and further complicate the function of the compensating piston 53.

As another advantage, the vertebrate members 28 are preferably sized to leave only a narrow radial clearance between them and the sleeve 39. In this manner, the longitudinal path through the enclosed space 41 that sound would otherwise travel unimpeded is materially restricted by the members 28. These members 28 will, therefore, serve as baffles or attenuators for sonic energy traveling through the oil-filled space 41.

Once the tool 10 is assembled, it will be appreciated from FIG. 2 that the internal bore through the sleeve 39 is sufficiently large that the lower housing 12 can be pulled off or slipped over the transducers 16–18 and stacked members 28 without disturbing them. Thus, should it be desired to make a routine repair or inspection, it is only a simple task to remove and replace the housing 12 without disassembling the stacked transducers 16–18 and members 28.

Accordingly, it will be appreciated that the present invention has provided a new and improved sonic logging tool that is fluidly sealed and mechanically strong. By sealing the transducers and other portions of the tool in the convoluted metal sleeve, a gas-tight enclosure is provided that is still nevertheless made substantially rigid and strong by virtue of the outer slotted housing. The separate vertebrate members support and properly space the sonic transducers as well as attenuate and delay any transmission of sound longitudinally along the housing.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Sonic well-logging apparatus comprising: at least two sonic transducers; means for spacing said transducers from one another and attenuating travel of sonic energy therebetween including a plurality of rigid members stacked into a column between said transducers and spacing means interposed between said rigid members, said spacing means having a lesser transverse cross-sectional area than said rigid members; and means interconnecting said rigid members for maintaining them in said stacked column.

2. The apparatus of claim 1 wherein said interconnecting means include spring means urging said rigid members and spacing means together.

3. The apparatus of claim 2 wherein said rigid members each have a bore therethrough that, when said members are stacked, provide a longitudinal passage through said stacked column; and said spring means include a helical spring extending through said passage.

4. The apparatus of claim 1 wherein said spacing means include a plurality of longitudinal projections on at least one of adjacent pairs of said rigid members and engaged on an opposed surface of the adjacent rigid member for maintaining said rigid members separated from one another.

5. The apparatus of claim 5 wherein said rigid members each have a bore therethrough that, when said members are stacked, provide a longitudinal passage through said stacked column; and said spring means include a helical spring extending through said passage.

6. The apparatus of claim 5 further including means on said projections and opposed surfaces cooperable therewith for making said column articulated.

7. Sonic well-logging apparatus comprising: a tubular housing; at least two sonic transducer supported at longitudinally-spaced locations in said housing; means on said housing for inhibiting the longitudinal transmission of sonic energy along said housing including recessed portions in said housing between said locations and extending outwardly from an inner wall of said housing; and a thin-wall metal sleeve in said housing and enclosing said transducers, said sleeve having portions complementarily received in said recessed housing portions for securing said sleeve thereto and materially restricting longitudinal travel of sonic energy along said sleeve.

8. The apparatus of claim 7 further including means between said transducers for attenuating travel of sonic energy within said housing including a plurality of members stacked together in an elongated column between said transducers; spacing means between adjacent ones of said stacked members, said spacing means having a materially lesser transverse cross-sectional area than said stacked members; and means for maintaining said stacked members and spacing means in a column.

9. The apparatus of claim 8 further including means on said stacked members and spacing means for articulating said column.

10. The apparatus of claim 9 wherein said spacing means include longitudinal projections on adjacent stacked members and complementary recesses in the opposed faces of said stacked members receiving said projections; said articulating means include complementary spherical mating surfaces on said projections and in said recesses; and said means for maintaining said stacked members in a column include a longitudinal passage through said stacked members, and a helical spring in said passage and connected at each end to the terminal stacked members.

11. Sonic well-logging apparatus comprising: a tubular housing; at least two sonic transducers at longitudinally-spaced locations in said housing; means for restricting longitudinal travel of sonic energy along said housing including a plurality of transverse slots in said housing spaced between said locations and staggered for substantially interrupting the longitudinal continuity of said housing; means for fluidly sealing said transducers within said housing and providing a fluid-tight chamber therein including a fluid-impermeable sleeve surrounding said transducers and having a plurality of spaced transverse convolutions respectively projecting into said transverse slots for materially restricting longitudinal travel of sonic energy along said sleeve; and means for supporting said transducers in said chamber including sound-attenuating means between said transducers, and means connecting one of said transducers to said housing.

12. The apparatus of claim 11 wherein said sound-attenuating means include a plurality of rigid members between said transducers, spacing means interposed between said rigid members and having a substantially lesser transverse cross-sectional area than said rigid members, and means for maintaining said rigid members and spacing means stacked together.

13. The apparatus of claim 11 wherein said sound-attenuating means include a plurality of rigid members having opposed transverse faces and arranged in a stacked column between said transducers, at least one of each adjacent pair of said members having a projection thereon of substantially lesser transverse cross-sectional area than said one rigid member and engaged with the opposed face of the adjacent member for holding the transverse faces of said rigid members apart, and means for urging said rigid members toward one another.

14. The apparatus of claim 11 wherein said sound-attenuating means include a plurality of rigid members having opposed transverse faces and arranged in a stacked column between said transducers, at least one of each adjacent pair of said rigid members having at least two longitudinal projections thereon engaged with the adjacent member for holding the transverse faces of adjacent rigid members apart, the total transverse cross-sectional area of said projections being substantially lesser than that of said one rigid member, and spring means for urging said rigid members toward one another.

15. The apparatus of claim 14 wherein each group of said projections are uniformly arranged on one face of a member about its central axis and have their free ends rounded to define a portion of a circumscribing spherical surface and further including corresponding recesses in the opposing face of the adjacent member respectively adapted to receive said free ends, each of said recesses having a mating spherical surface complementary to that of said projections.

16. The apparatus of claim 15 wherein said rigid members are each annular and have a longitudinal bore therethrough for defining an axial passage through said stacked members; and said spring means for urging said rigid members toward one another include a coiled spring disposed in said axial passage and connected at each end thereof to one of said transducers to urge them and said stacked members toward one another.

17. The apparatus of claim 16 further including an annular groove in each of said rigid members opening into said longitudinal bore and extending radially outwardly a sufficient distance therefrom to at least undercut said projections.

18. The apparatus of claim 17 wherein said rigid members are of a homogeneous non-plastic material.

19. The apparatus of claim 17 wherein said rigid members are of a metal selected from a group consisting of aluminum, magnesium, brass, and alloys thereof.

20. Sonic well-logging apparatus comprising: a tubular housing; at least two sonic transducers at longitudinally-spaced locations in said housing; first means for attenuating longitudinal travel of sonic energy along said housing; and second means for attenuating longitudinal travel of sonic energy within said housing including a plurality of rigid members stacked together between said transducers, said rigid members having a transverse cross-sectional area sufficient to materially block longitudinal travel of sound within said housing, and spacing means interposed between said rigid members and having a substantially lesser transverse cross-sectional area than said rigid members.

21. The apparatus of claim 20 further including means for connecting said rigid members and transducers together, and means for supporting one of said transducers on said housing.

22. The apparatus of claim 20 further including means for sealingly enclosing said transducers within said housing.

23. The apparatus of claim 20 wherein said rigid members and spacing means are annular and further including a helical spring extending through said stacked members for urging said members toward one another.

24. The apparatus of claim 23 further including support means connecting one of said transducers to said housing, first means connecting one end of said spring to said housing, and second means connecting the other end of said spring to the other of said transducers.

25. The apparatus of claim 20 further including means on said rigid members and spacing means for articulating said members, means for urging said rigid members and transducers together, and means for supporting one of said transducers on said housing.

26. Sonic well-logging apparatus comprising: a tubular housing; a first electrically-responsive sonic transducer connected to said housing; a second electrically-responsive sonic transducer in said housing and longitudinally spaced from said first transducer; first means for attenuating longitudinal travel of sonic energy along said housing; second means for attenuating longitudinal travel of sonic energy within said housing including a plurality of rigid annular members having opposed transverse faces and so arranged in a stacked column between said transducers to provide an axial passage therethrough, at least one of each adjacent pair of said rigid members having at least two longitudinal projections thereon engaged with the adjacent member for holding the transverse faces of adjacent rigid members apart; and means for supporting said second transducer and maintaining said rigid members stacked together including a helical spring extending through said axial passage connected at one end to said second transducer and at the other end of said housing.

27. The apparatus of claim 26 further including a third electrically-responsive sonic transducer that is annular, said third transducer being interposed and secured between adjacent ones of said rigid members and around said helical spring.

28. The apparatus of claim 26 wherein each of said rigid members have a plurality of peripheral grooves thereon between the opposed faces and uniformly distributed about the circumference thereof and adapted to receive electrical conductors in said housing, and means on said rigid members cooperable with said projections for maintaining adjacent rigid members in the correct angular relationship with one another to align said peripheral grooves and provide a plurality of continuous helical grooves around the periphery of said stacked members.

References Cited

UNITED STATES PATENTS

| | | | |
|---|---|---|---|
| Re. 24,931 | 1/1961 | Overton | 181—.5 |
| 2,350,371 | 6/1944 | Smith | 340—17 |
| 2,790,964 | 4/1957 | Schurman | 340—17 |
| 2,847,655 | 8/1958 | Schurman | 340—17 XR |
| 3,009,131 | 11/1961 | Woodworth | 340—17 |
| 3,056,463 | 10/1962 | Summers | 340—17 XR |
| 3,063,035 | 11/1962 | Vogel et al. | 340—17 |
| 3,188,607 | 6/1965 | Woodworth | 340—17 |

FOREIGN PATENTS

| | | |
|---|---|---|
| 693,222 | 8/1964 | Canada. |
| 752,296 | 7/1956 | Great Britain. |
| 823,721 | 11/1959 | Great Britain. |

BENJAMIN A. BORCHELT, *Primary Examiner.*

R. M. SKOLNIK, *Assistant Examiner.*